United States Patent
Decker et al.

(10) Patent No.: US 8,388,283 B2
(45) Date of Patent: Mar. 5, 2013

(54) CHIP CATCHER FOR WELD TIP DRESSER

(75) Inventors: Randall H. Decker, Thompson's Station, TN (US); Robert C. Kennedy, Columbia, TN (US); Mark R. Churitch, Brentwood, TN (US)

(73) Assignee: GM Global Technology Operations LLC, Detroit, MI (US)

( * ) Notice: Subject to any disclaimer, the term of this patent is extended or adjusted under 35 U.S.C. 154(b) by 1121 days.

(21) Appl. No.: 12/329,857

(22) Filed: Dec. 8, 2008

(65) Prior Publication Data

US 2010/0143061 A1    Jun. 10, 2010

(51) Int. Cl.
*B23Q 11/08* (2006.01)
*B23Q 11/00* (2006.01)
*B23C 3/00* (2006.01)

(52) U.S. Cl. ......... 409/137; 409/140; 409/134; 451/453

(58) Field of Classification Search .................. 409/137, 409/134, 138–140; 451/451, 453, 456
See application file for complete search history.

(56) References Cited

U.S. PATENT DOCUMENTS

| | | | | |
|---|---|---|---|---|
| 6,106,203 A | * | 8/2000 | Asmis et al. | 409/137 |
| 7,523,690 B1 | * | 4/2009 | Hensley et al. | 82/1.11 |
| 2003/0002945 A1 | * | 1/2003 | Sunaga et al. | 409/140 |
| 2003/0013395 A1 | * | 1/2003 | Sakai | 451/453 |

FOREIGN PATENT DOCUMENTS

| | | | | |
|---|---|---|---|---|
| JP | 59-127979 A | * | 7/1984 | |
| JP | 03-018067 Y2 | * | 4/1991 | |
| JP | 2002-254174 A | * | 9/2002 | |
| JP | 2003-080374 A | * | 3/2003 | |
| JP | 2004-202504 A | * | 7/2004 | |

OTHER PUBLICATIONS

Machine Translation of JP 2003-080374, which JP '374 was published Mar. 2003.*
Machine Translation of JP 2004-202504, which JP '504 was published Jul. 2004.*
Translation of JP 03-018067-Y2, which JP '067 was published Apr. 1991.*

* cited by examiner

*Primary Examiner* — Erica E Cadugan
(74) *Attorney, Agent, or Firm* — Quinn Law Group, PLLC

(57) ABSTRACT

An apparatus for collecting weld tip chips created by a weld tip dresser is provided that "catches" the chips at the cutting tool and collects them in a container, preventing their disbursement on the factory floor. The apparatus includes a body adapted for connection to the weld tip dresser and with an opening therethrough configured to permit the weld tip dresser therethrough. The body defines an air inlet passage extending from an outer surface of the body to the opening. The body defines an air outlet passage from the opening to the outer surface. A pressurized air supply is connected to the body at the air inlet passage and is configured to blow air through the air inlet passage to blow chips from the opening through the air outlet passage. A container is operatively connected to the body at the air outlet passage for collecting chips blown from the opening.

4 Claims, 4 Drawing Sheets

US 8,388,283 B2

CHIP CATCHER FOR WELD TIP DRESSER

TECHNICAL FIELD

The invention relates to an apparatus for a weld tip dresser.

BACKGROUND OF THE INVENTION

Robotic welding assemblies are commonly used to weld manufactured components, such as vehicle components. The weld tips used in these assemblies must be periodically dressed to remove excess weld material that tends to buildup with repeated usage. Removal of the weld material is necessary to maintain the precise weld tip geometry necessary for accurately positioned welds of reliable strength. Weld tip dressers are commonly used to remove the weld material. A weld tip dresser has a cutting tool that acts on the weld tips to remove the excess material and reconfigure the tip to the desired geometry. Typically, the material removed by the weld tip dresser falls to the factory floor and must be periodically swept away or otherwise disposed of. Minimizing the downtime required for the weld tip dressing procedure and associated cleanup is desirable to maintain scheduled production goals.

SUMMARY OF THE INVENTION

An apparatus for collecting weld tip chips created by a weld tip dresser is provided that "catches" the chips at the cutting tool and collects them in a container, preventing their disbursement on the factory floor. The apparatus includes a body adapted for connection to the weld tip dresser and with an opening therethrough configured to permit the weld tip dresser therethrough. The body defines an air inlet passage extending from an outer surface of the body to the opening. The body defines an air outlet passage from the opening to the outer surface. A pressurized air supply is connected to the body at the air inlet passage and is configured to blow air through the air inlet passage to blow chips from the opening through the air outlet passage. A container is operatively connected to the body at the air outlet passage for collecting the chips blown from the opening.

A method of collecting excess weld material removed by a weld tip dresser includes aligning an opening in a collection apparatus with the weld tip dresser. The method further includes mounting the aligned collection apparatus to the weld tip dresser, and blowing air through the collection apparatus while simultaneously dressing weld tips with the weld tip dresser to collect excess weld material from the opening.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
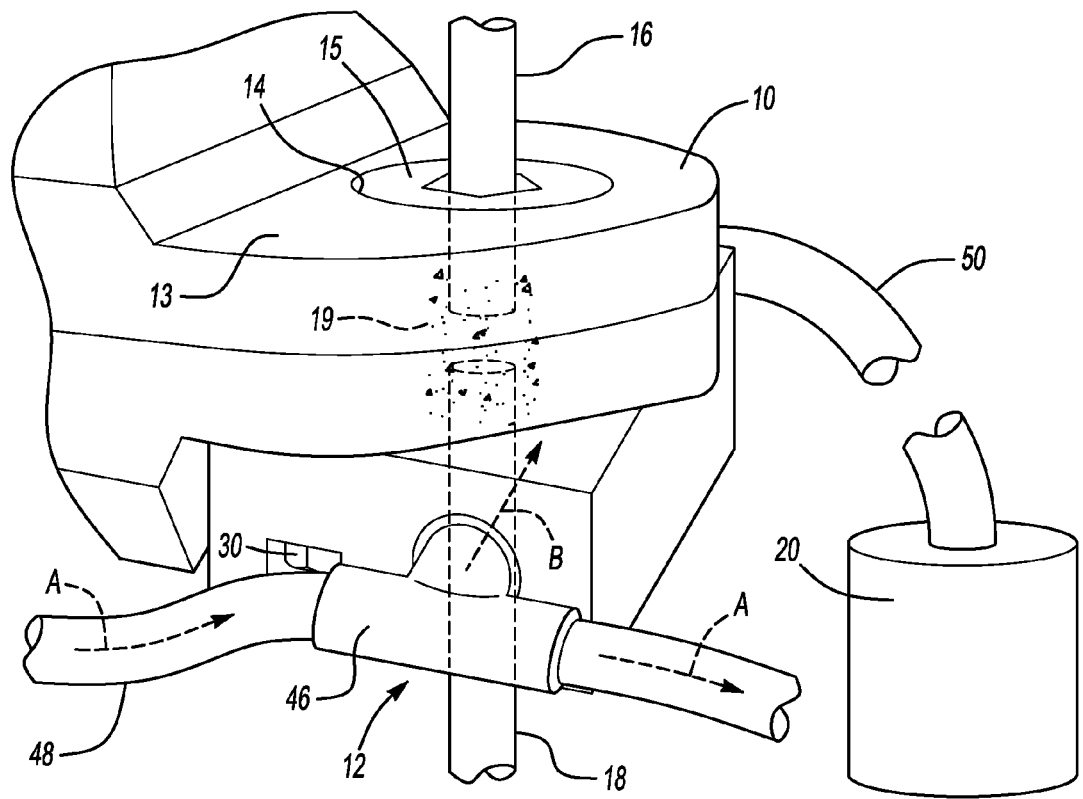
FIG. 1 is a schematic perspective fragmentary view of a first embodiment of a weld tip dresser with an apparatus for collecting excess weld material.

Referring to the drawings, wherein like reference numbers refer to like components throughout the several views, FIG. 1 shows a weld tip dresser 10 with an apparatus 12 for collecting excess weld material mounted thereto. The apparatus 12 may also be referred to as a weld chip catcher. The weld tip dresser 10 includes a support base 13 with an opening 14 therethrough. A cutting tool 15 is mounted in the opening 14. A pair of weld tips 16, 18 extend through the opening 14 from opposing directions (here from above and below) into the cutting tool 15 and are "dressed" by the tool 15 to maintain a preferred shape for providing accurate and exacting welds. The dressing operation causes the removal of excess weld material 19 from the tips 16, 18, also referred to as weld chips 19. The weld chips 19 are collected in a container 20, as described further below. This prevents the buildup of chips 19 on the factory floor, eliminating contamination of the factory and slowing of processing time while cleanup is performed.

The base 13 of the weld tip dresser 10 is preferably on a robotic arm that allows rotation of the base to position the cutting tool 15 for ease of access to weld tips 16, 18 positioned in other layouts, such as opposing one another horizontally.

Figure 2:
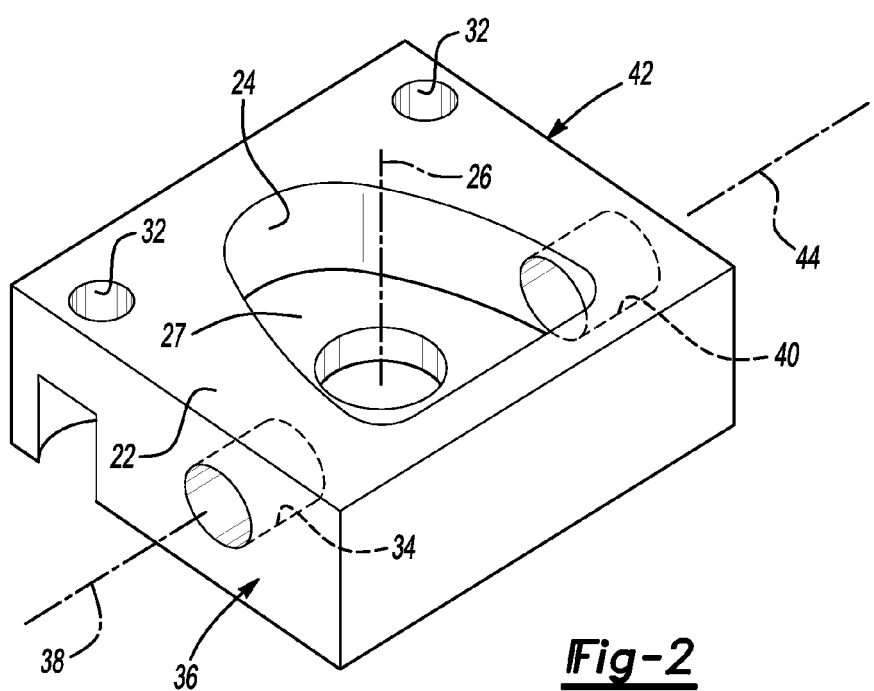
FIG. 2 is a schematic perspective view of a collector body of the apparatus of FIG. 1.
Figure 3:
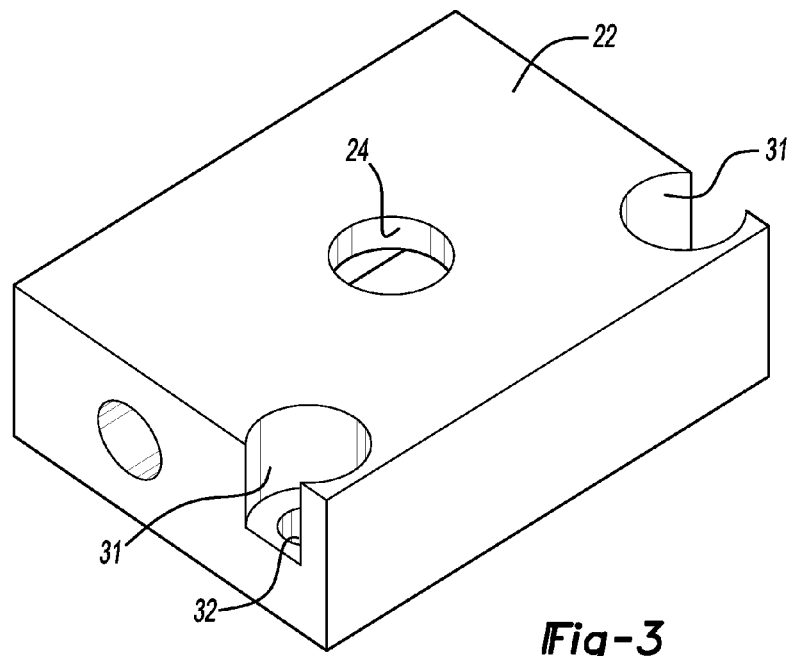
FIG. 3 is a schematic perspective bottom view of the collector body of FIGS. 1 and 2.

The chip catcher apparatus 12 includes a body 22 configured to catch the weld chips 19. As best illustrated in FIGS. 2 and 3, the body 22 is configured with a stepped opening 24 extending therethrough. The opening 24 defines a central axis 26 and is narrowed at a step 27. Bolts 30, best illustrated in FIG. 1, secure the body 22 to the support base 13 of the weld tip dresser 10 by extending through openings 32. The head of each bolt 30 is retained in a respective bolt access cavity 31 formed in the body 22. When bolted to the support base 13, the opening 24 aligns with the opening 14 and dressing tool 15. Thus, chips removed by the tool are moved into the opening 14 by gravity, as will occur when the body 22 is below the flange 13. However, the collection apparatus 12 ensures that the chips 19 will move into the opening 24 by forcing air across the opening 24 to pull the chips 19 into the air flow. The body 22 is configured with an air inlet passage 34 that extends from an outer surface 36 to the opening 24 about a center axis 38. Additionally, an air outlet passage 40 extends from an outer surface 42 to the opening 24 about a center axis 44. The axes 38, 44 are substantially perpendicular to the axis 26. As shown in FIG. 1, a T-fitting 46 is inserted at the passage 34. The passage 34 may have a threaded tube therein to which the T-fitting 46 is threaded. An air supply 48 is connected to the T-fitting 46 perpendicular to the passage 34 and blows in direction A. A portion of the pressurized air blows into the inlet passage 34, across the opening 24 and into the outlet passage 40 as illustrated by arrow B. The blowing air entrains chips 19 within the opening 24 and blows them out of the outlet passage 40. An exit tube 50 is connected at the outlet passage 40 and carries the expelled chips 19 to the container 20.

Figure 4:
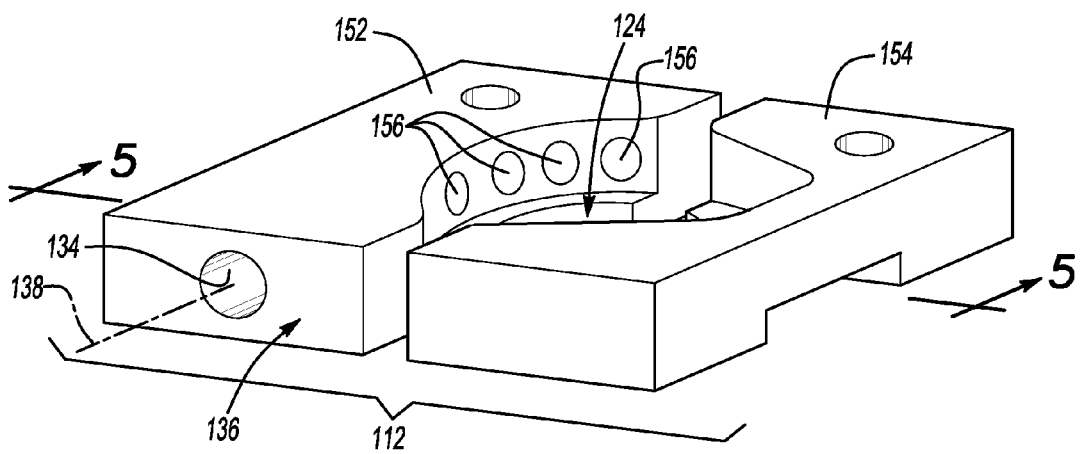
FIG. 4 is a schematic perspective exploded view of a second embodiment of a collector body of an apparatus for collecting excess weld material for use on the weld tip dresser of FIG. 1.
Figure 5:
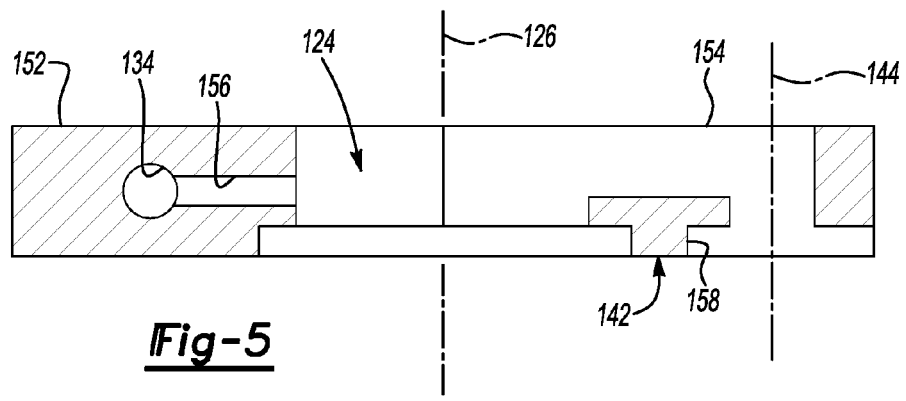
FIG. 5 is a schematic cross-sectional view of the collector body of FIG. 4 taken at the lines 5-5.
Figure 6:
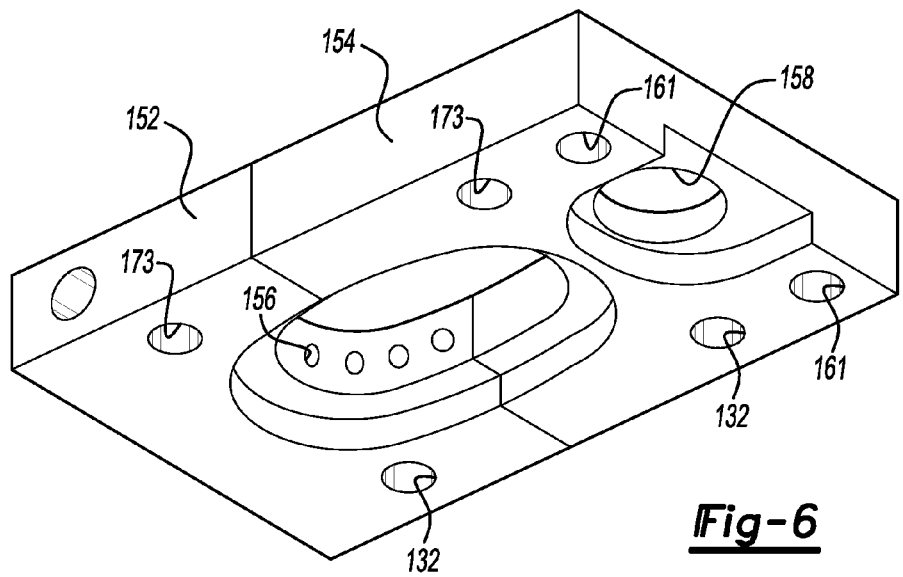
FIG. 6 is a schematic perspective bottom view of the collector body of FIGS. 4 and 5.
Figure 7:
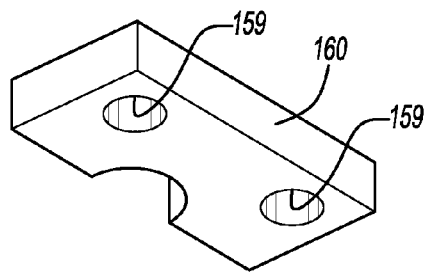
FIG. 7 is a schematic perspective view of an adapter clip included in the second embodiment of the apparatus for mounting to the collector body of FIGS. 4-6.
Figure 8:
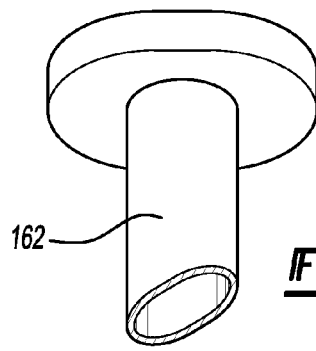
FIG. 8 is a schematic perspective view of a chip collection tube for attachment to the apparatus of FIGS. 4-6 using the adapter clip of FIG. 7.
Figure 9:
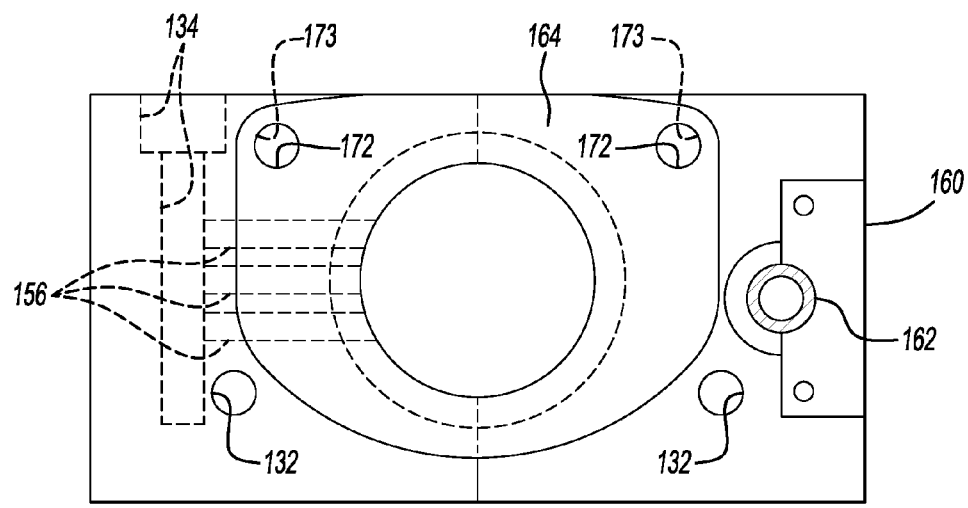
FIG. 9 is a schematic bottom view of the collector body of FIGS. 4-7 with the adapter clip of FIG. 7 mounted thereto.
Figure 10:
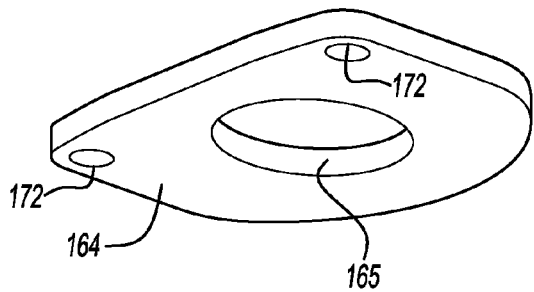
FIG. 10 is a schematic perspective illustration of a first embodiment of a weld tip guard disk.
Figure 11:
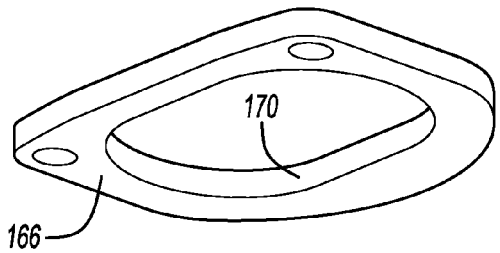
FIG. 11 is a schematic perspective illustration of a second embodiment of a weld tip guard disk.

Referring to FIGS. 4-11, a second embodiment of a chip collection apparatus 112 is illustrated. In FIG. 4, a first body portion 152 and a second body portion 154 make up the body of the apparatus 112. The body portions 152, 154 abut together to define an opening 124 therethrough, best shown in FIG. 6. An air inlet passage 134 extends from outer surface 136 in communication with circumferentially spaced cross passages 156, best shown in phantom in FIG. 9. The cross passages 156 establish fluid communication between the air inlet passage 134 and the opening 124. An air outlet passage 158 extends from a bottom outer surface 142 in communication with the opening 124. A central axis 138 (see FIG. 4) of the air inlet opening 134 is generally perpendicular to the central axis 126 (see FIG. 5) of opening 124 and central axis 144 of air outlet passage 158. FIG. 7 shows an adapter clip 160 used to secure an air outlet tube 162 to the second body portion 154 at air outlet passage 158, as illustrated in FIG. 9. Bolt openings 159 in the adapter clip align with openings 161 in the second body portion 154 to enable securement of the outlet tube 162 to the second body portion 154 with bolts or other fasteners (not shown). FIG. 10 shows a weld tip guard disk 164 with a generally circular opening 165. The disk 164 is secured to the body portions 152, 154 at the opening 124, as shown in FIG. 9, to protect the weld tip 18 of FIG. 1 as it is placed through the opening 124 toward the tool 15. Openings 172 in disk 164 allow the disk 172 to be secured at the body portions 152, 154 using bolts or other fasteners (not shown) extending through aligned openings 173. FIG. 11 shows an alternative annular tip guard disk 166 that has an elongated opening 170 that is useful for allowing entrance of a weld tip situated at an angle to opening 124 (i.e., not parallel with the axis 126). The chip collection apparatus 112 may be secured to the weld tip dresser 10 of FIG. 1 by extending bolts 30 through openings 132 and into the support base 13 to collect weld chips 19, using the air supply 48 connected at air inlet passage 134, with a T-fitting or other type of fitting, and with the tube 162 leading to the container 120.

Figure 12:
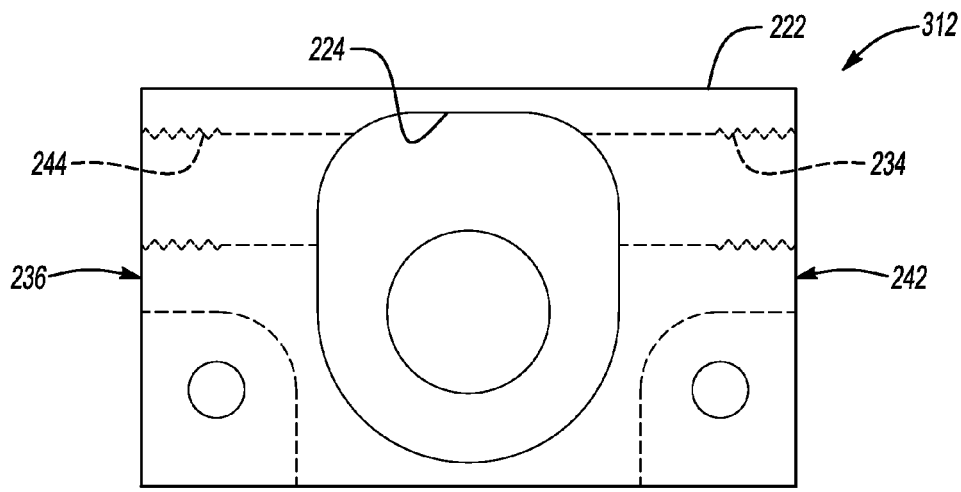
FIG. 12 is a schematic top view of a collector body for a third embodiment of an apparatus for collecting excess weld material.
Figure 13:
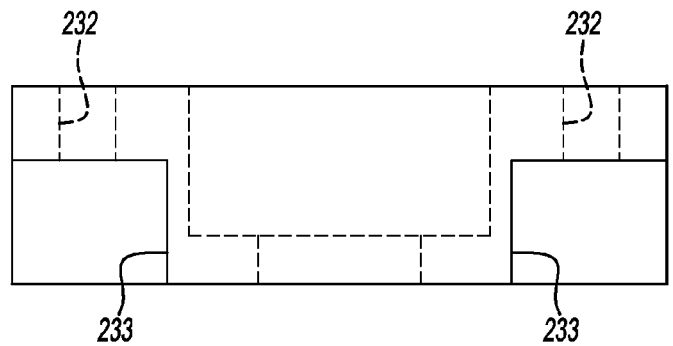
FIG. 13 is a schematic side view of the collector body of FIG. 12.

Referring to FIGS. 12 and 13, a third embodiment of a chip collection apparatus 312 includes a body 222 with a stepped opening 224 therethrough. An air inlet passage 244 extends from an outer side surface 236 to the opening 224, and an air outlet passage 234 extends from opening 224 to outer side surface 242. Bolt openings 232 allow the body 222 to be secured to the weld tip dresser support base 13 of FIG. 1, with the bolt heads nested in open corner cavities 233 for ease of access.

A method of collecting excess weld material removed by a weld tip dresser is described with respect to FIGS. 1-3. First, the method includes aligning an opening 24 in a collection apparatus 12 with a weld tip dresser 10. Next, the method includes mounting the aligned collection apparatus 12 to the weld tip dresser 10. The method may further includes securing an air supply line 48 at an air inlet passage 34 of the body 22 of the apparatus 12, and securing a collection tube 50 at an air outlet passage 40 of the body 12. A container 20 may be positioned at an exit of the collection tube 50. The method further includes blowing air through the collection apparatus 12 while simultaneously dressing weld tips 16, 18 with the weld tip dresser 10 to collect excess weld material 19 from the opening 24.

Accordingly, the collection apparatus 12 enables efficient collection of excess weld material during weld tip dressing, preventing buildup of the excess material as debris on the production line floor. The collection apparatus 12 does not interfere with flexible positioning of the weld tip dresser 10 to reach weld tips aligned in different configurations.

While the best modes for carrying out the invention have been described in detail, those familiar with the art to which this invention relates will recognize various alternative designs and embodiments for practicing the invention within the scope of the appended claims.

The invention claimed is:

1. An apparatus for collecting excess weld material removed by a weld tip dresser, comprising:
    a single, unitary, one-piece body adapted for connection to the weld tip dresser and with a body opening therethrough configured to align with the weld tip dresser;
    wherein the body defines an air inlet passage extending from an outer surface of the body and in fluid communication with the opening;
    wherein the body defines an air outlet passage at the outer surface and in fluid communication with the opening;
    a pressurized air supply connected to the body at the air inlet passage and configured to blow air through the air inlet passage to blow the excess weld material from the opening through the air outlet passage;
    wherein the body has corners with open cavities at the corners; and wherein the body has fastener openings extending from the open cavities.

2. The apparatus of claim 1, wherein the body opening is a stepped opening.

3. The apparatus of claim 1, wherein the air outlet passage and the air inlet passage are arranged to define central axes perpendicular to a central axis defined by the body opening.

4. The apparatus of claim 1, in combination with the weld tip dresser; and
    wherein the body connects to the weld tip dresser by fasteners extending through the fastener openings such that heads of the fasteners are nested in the open cavities.

* * * * *